United States Patent [19]
Lucasey et al.

[11] 3,913,880
[45] Oct. 21, 1975

[54] SUPPORT STAND FOR AN APPLIANCE

[76] Inventors: Joseph A. Lucasey, 2639 E. 9th St., Oakland, Calif. 94601; William L. Boscacci, 2419 Edgehill Court, San Leandro, Calif. 94577

[22] Filed: Mar. 28, 1974

[21] Appl. No.: 455,920

[52] U.S. Cl. .................... 248/415; 248/203; 70/232
[51] Int. Cl.² .................... F16M 13/00; A47H 1/10; F16B 41/00
[58] Field of Search ........... 248/415, 203, 278, 418; 70/371, 231, 232; 211/4, 8, 9; 312/7 TV; 297/349

[56] References Cited
UNITED STATES PATENTS

| | | | |
|---|---|---|---|
| 1,741,161 | 12/1929 | McCaleb | 70/232 |
| 2,755,655 | 7/1956 | Maffey | 70/232 |
| 3,291,432 | 12/1966 | Lucasey | 248/203 |
| 3,415,085 | 12/1968 | Eble | 70/232 |
| 3,559,942 | 2/1971 | Lucasey | 248/278 |
| 3,724,798 | 4/1973 | Lucasey | 248/203 |
| 3,798,938 | 3/1974 | McCullum | 70/232 |

*Primary Examiner*—Roy D. Frazier
*Assistant Examiner*—Robert A. Hafer
*Attorney, Agent, or Firm*—Theodore J. Bielen, Jr.; Richard Esty Peterson

[57] ABSTRACT

A support stand with a locking mechanism for supporting and securing a television receiver or other appliance placed in a motel guest room. The support stand includes a base securable to a floor, a columnar post secured to the base, a platform assembly pivotally connectable to the distal end of the post and a locking mechanism for releasably securing the platform assembly to the post permitting only authorized removal of the receiver from the stand.

11 Claims, 9 Drawing Figures

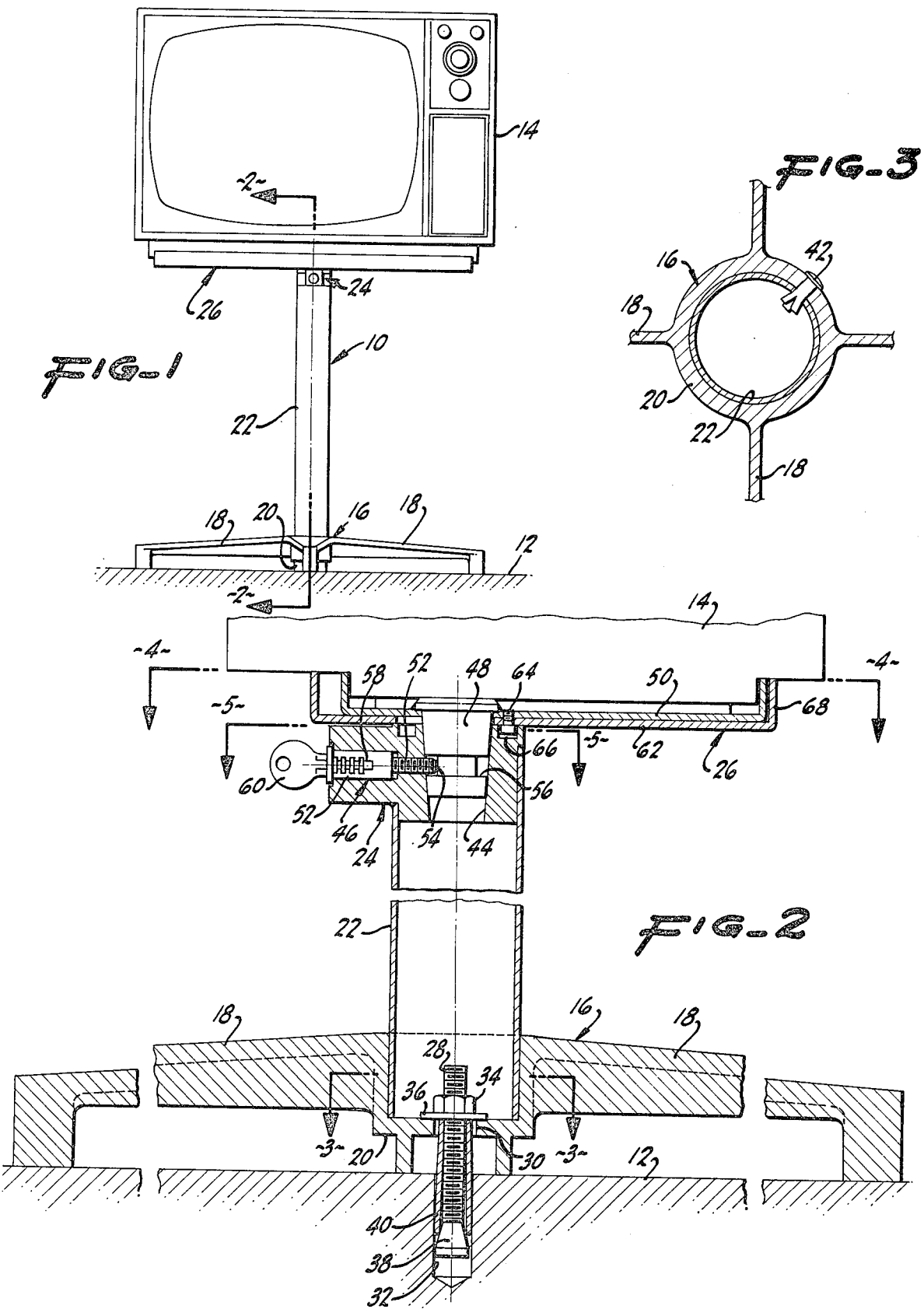

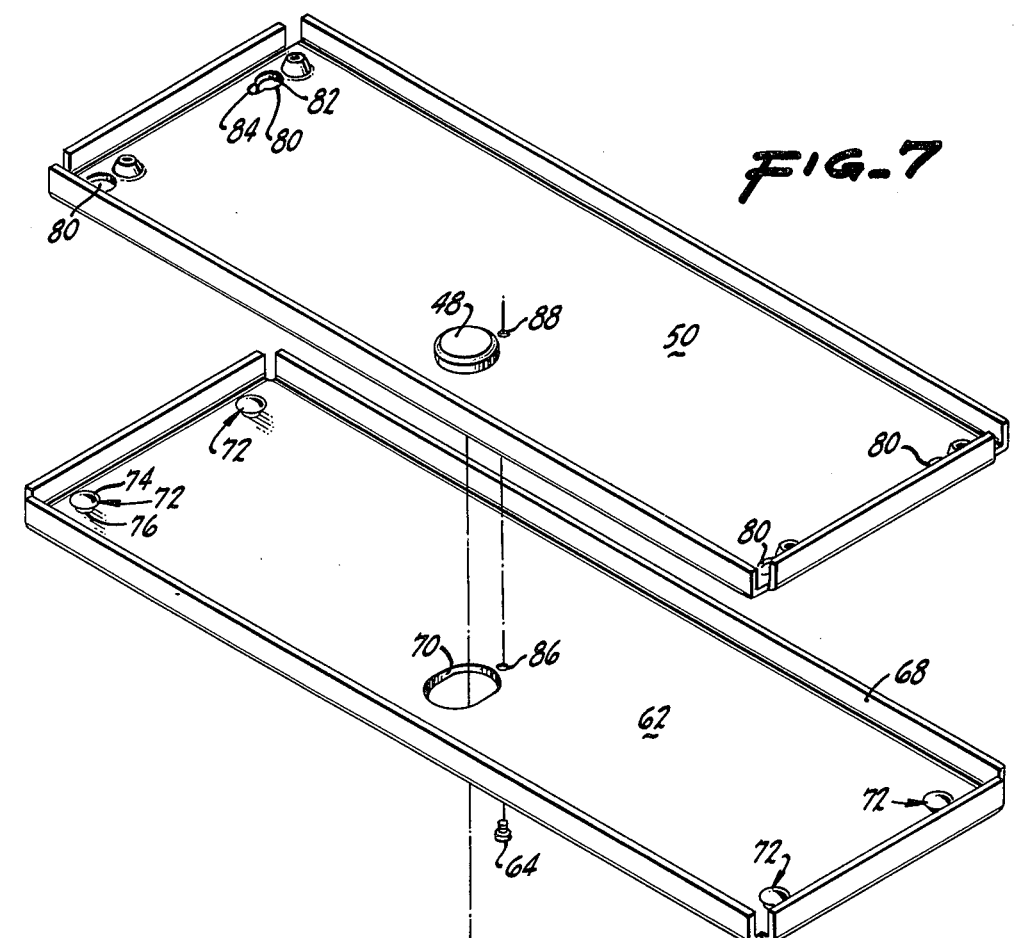
FIG. 7
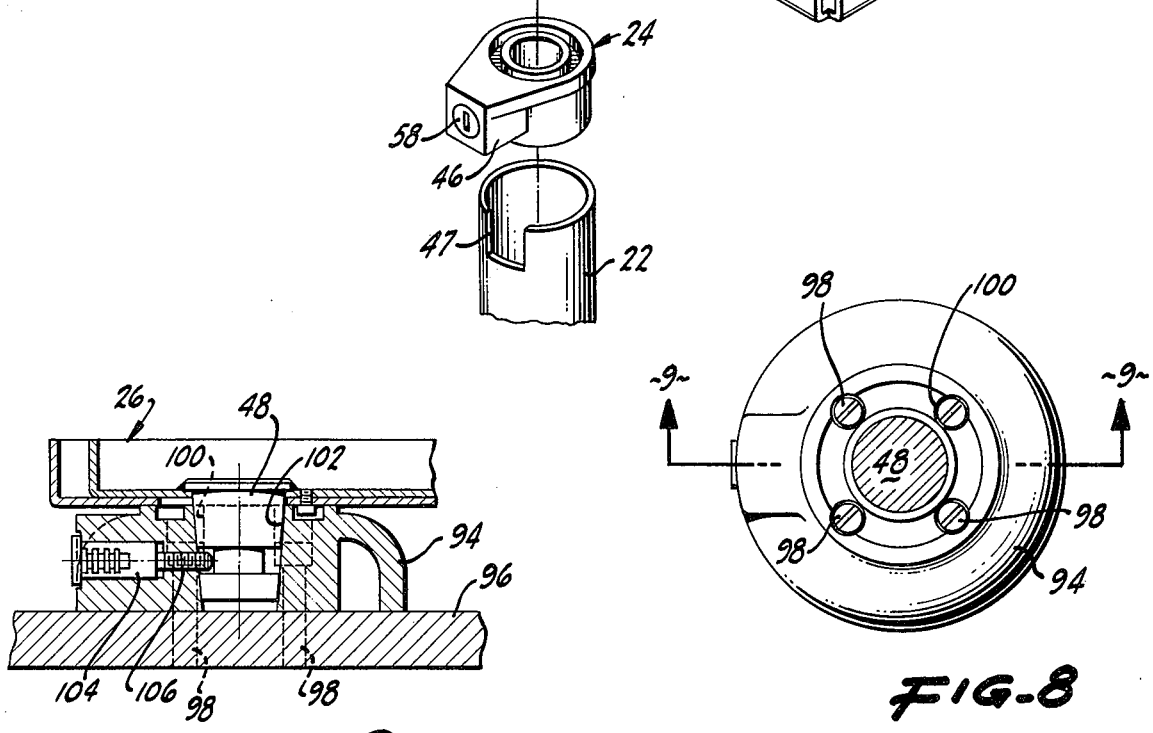
FIG. 9
FIG. 8

SUPPORT STAND FOR AN APPLIANCE

BACKGROUND OF THE INVENTION

This invention relates to a stand for supporting a television receiver or other appliance in an environment where theft is a problem, for example in a motel or hotel room, or in any room where constant surveillance is impractical. Televisions, radios, recorders and other expensive appliances placed in public or quasi-public areas have became a target for theft.

This problem of appliance theft is particularly acute where televisions are placed in hotel or motel rooms. In such areas the privacy of the environment permits substantial tampering to occur without detection. In such instance, securing the television with conventional exposed fasteners inadequately protects the appliance from theft.

Preferably, a support stand must not only be tamperproof, but must allow for convenient normal use of the appliance and further provide for simple authorized removal of the appliance from the stand, for example when repairs are necessary.

SUMMARY OF THE INVENTION

The support stand of the present invention provides an attractive means of securing an appliance, for example, a television receiver, to a surface, such as a floor or table top in a manner which substantially prevents theft of the appliance. The support stand includes a base which rests on the surface and is secured thereto. The principal embodiment of the invention includes a columnar post for elevating the appliance above the base. The post is fixed to the base and includes at its distal end a mounting unit having a beveled socket and a locking mechanism.

In an alternate embodiment where it is not necessary to elevate the appliance above the under surface, the post is eliminated and the base integrally includes the locking mechanism and beveled socket. This embodiment is particularly suited for securing the appliance to a table or counter top.

In both embodiments the beveled socket receives a boss or spindle having a concomitant bevel which allows the spindle to rotate in the socket. The spindle is fixed to a support platform that is directly fastened to the underside of an appliance with conventional fasteners such as machine screws. Covering the exposed face of the support platform is a cover shield, which eliminates access to the fasteners on the support platform. The cover shield is fastened to the support platform by projecting rivets fixed to the cover shield. The rivets are insertable through keyhole slots in the support platform such that platform and shield can be slidably engaged without exposed fasteners. This slidable engagement of platform and shield is fixed by a single screw located adjacent an aperture in the shield through which the spindle fixed to the platform projects.

The otherwise exposed bolt is concealed in a circular slot, concentric to the socket in the mounting unit, when the appliance with attached platform and shield is installed on the mounting unit of the support stand. This manner of coupling permits the appliance to be freely pivoted with respect to the base of the support stand.

Locking of the appliance to the support stand is accomplished by the locking mechanism in the mounting unit in cooperation with a peripheral channel in the beveled surface of the spindle. A key operated bolt in the locking mechanism of the mounting unit is projected into the peripheral channel of the spindle when the spindle is seated in the socket. In this manner, the spindle is permitted to rotate, but is unable to be withdrawn from the socket. Only by key operating the bolt to retract the bolt from the channel can the spindle and attached appliance be separated from the mounting unit and remainder of the support stand.

The above described arrangement provides a secured assembly without exposed fasteners. The attached appliance is free to rotate and can be easily and quickly removed only by use of a pass key.

BRIEF DESCRIPTION OF THE DRAWINGS

FIG. 1 is a front elevational view of the support stand with a television receiver secured to the stand and the stand fixed to a floor.

FIG. 2 is an enlarged sectional view, partially fragmented, taken on the lines 2—2 in FIG. 1, detailing the elements of the support stand.

FIG. 3 is a cross-sectional view, partially fragmented, taken on the lines 3—3 in FIG. 2, detailing a connector in the stand.

FIG. 7 is an exploded perspective view of the upper portion of the support stand.

FIG. 8 is a plan view, partially in sections, of an alternate embodiment of the support stand.

FIG. 9 is a cross-sectional view, taken on the lines 9—9 in FIG. 8 of the alternate embodiment of the support stand for supporting an appliance on a table top.

DETAILED DESCRIPTION OF THE PREFERRED EMBODIMENTS

Figure 4:
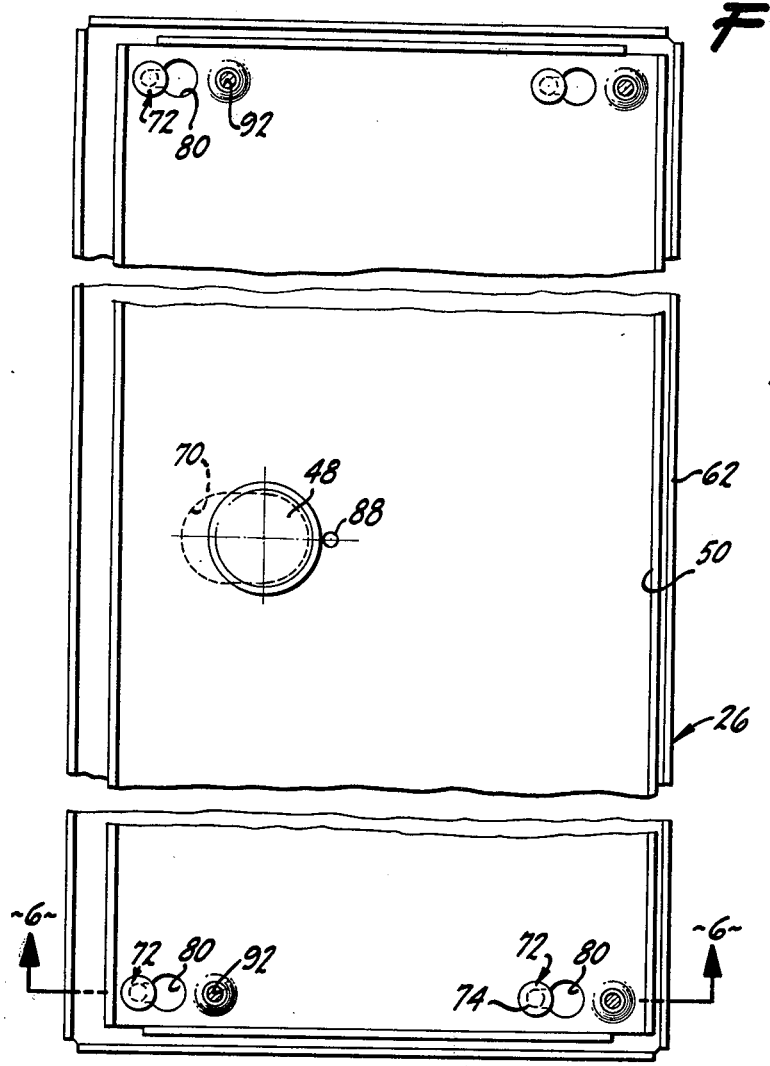
FIG. 4 is a cross-sectional view, partially fragmented, taken on the lines 4—4 in FIG. 2, detailing the support for the television receiver.

Referring to FIG. 1, a preferred embodiment of the support stand, designated generally by reference numeral 10, is shown standing on a floor 12 and supporting a television receiver 14. The arrangement shown in FIG. 1 illustrates the cooperative manner in which the invented stand is used with an exemplar appliance to form an attractive unit in which the salient tamperproof features are only evident on detailed inspection.

The support stand includes a base 16 with four legs 18 spanning from a central core 20 which is fixed directly to the floor 12 as described in greater detail hereafter. Connected to the base 16 is a columnar post 22 having a mounting unit 24 which pivotally engages a platform assembly 26 on which the television receiver 14 is carried.

The enlarged cross-sectional view of FIG. 2 illustrates in greater detail the arrangement of the support stand 10. The base 16 is directly and fixedly mounted to the floor 12 by an expansion bolt 28 which is inserted through a hole 30 in the core 20 of the base and into a pre-drilled hole 32 in the floor 12. By tightening a nut 34 seated on a washer 36 in the core 20, a wedge 38 expands a split sleeve 40, extended into the hole 32 in the floor, thereby locking the base to the floor. The nut 34 of the expansion bolt 28 can be tightened by a socket wrench with an extension that is inserted down through the post 22.

As shown in FIG. 2, the post 22 is tubular and inserted into a cup-like recess in the core 20 of the base 16. While the post may be welded to the base, it is preferred that a rivet 42, as shown in FIG. 3, pin the base 16 to the post 22. In this manner, the support stand can be shipped in a more compact fashion before final assembly. A pop or explosive rivet is most convenient for final assembly of the post and base.

Returning again to a consideration of FIG. 2, at the distal end of the post 22 is a mounting unit 24 which includes a beveled socket 44 and a locking mechanism 46. Referring briefly to FIG. 7, the mounting unit 24 is insertable on the post 22 which has an end notch 47 to accommodate the projecting locking mechanism 46 in the mounting unit. The mounting unit 24 and post are welded together to prevent unauthorized separation.

The beveled socket 44 receives a boss or spindle 48 which projects from and is fixedly attached to a support platform 50 in the platform assembly 26. The cooperative arrangement of beveled socket 44 and a concomitant beveled surface of the spindle 48 allows the support assembly 26 and carried television receiver 14 to angularly rotate with respect to the mounting unit, post and base.

The locking mechanism 46 in the mounting unit 24 includes a key operated bolt 52 arranged in the mounting unit such that the distal end 54 of the bolt 52 is extendible into the socket, much in the manner of a set screw. However, rather than engaging directly the spindle, the distal end 54 of the bolt 52 projects without contact into a peripheral channel 56 in the beveled surface of the spindle. In this position, as shown in FIG. 2, the spindle cannot be withdrawn from the socket.

The key operated bolt 52 includes a tumbler and cylinder unit 58 that can only be operated by a key 60. When the key 60 is inserted, the bolt 52 can be extended or retracted by rotating the key.

When the bolt is extended into the peripheral channel of the spindle, the bolt does not interfere with the free rotation of the spindle and connected platform assembly. When the bolt is withdrawn, the spindle is released and the television receiver connected to the platform assembly can be removed.

As shown in FIG. 2, the platform assembly includes a support platform 50 and a cover shield 62. The platform 50 and shield 62 are secured together by a small machine screw 64. The head of the machine screw 64 is only exposed when the platform assembly 26 is removed from the mounting unit 24. When assembled, as shown in FIG. 2, the machine screw 64 is received without contact in a circular slot 66 in the top of the mounting unit 24.

Figure 5:
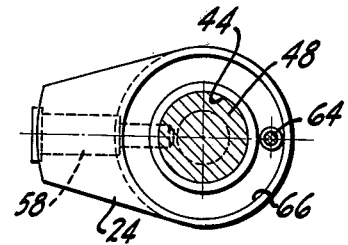
FIG. 5 is a cross-sectional view taken on the lines 5—5 in FIG. 2, detailing the mounting unit of the support stand.

The top of the mounting unit 24 is shown in greater detail in FIG. 5. As therein illustrated, the machine screw 64 is received by the slot 66, which is concentrically arranged with respect to the spindle and socket. In this manner, the machine screw 64 will not interfere with the free rotation of the platform assembly and attached appliance.

Figure 6:
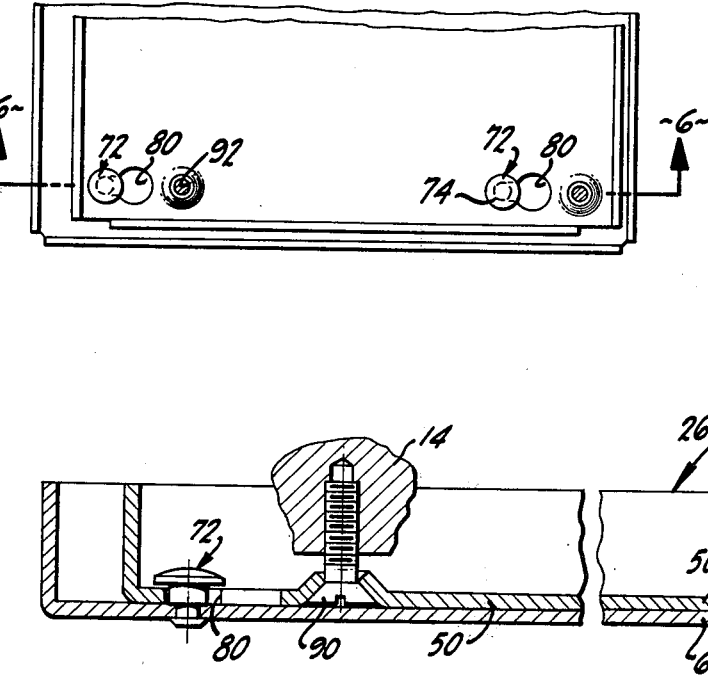
FIG. 6 is a cross-sectional view taken on the lines 6—6 in FIG. 4, detailing the support assembly for the television receiver.

The arrangement of the platform assembly 26 is shown in greater detail in FIGS. 4, 6 and 7.

Referring to FIGS. 4 and 6, the platform assembly includes the support platform 50 seated or nested within the periphery of the cover shield 62. The manner in which this coupled arrangement is achieved is best shown in the exploded view of FIG. 7.

The cover shield 62 is rectangular with elevated peripheral sides. A centrally located oblong hole 70 is arranged to receive the projecting spindle 48 attached to the support platform 50. In the four corners of the shields 62 are four fixed rivets 72 each having a raised head 74 and exposed neck 96.

The support platform 50 has a similar but smaller rectangular configuration with elevated peripheral sides 78. In the four corners of the platform are four keyhole slots 80. The slots have an enlarged circular portion 82 and a narrow throat portion 84, also illustrated in FIG. 4.

The congruent arrangement of keyhole slots 80 allows the head 74 of each rivet 72 to be inserted through the circular portion 82 of each opposite slot 80. By transversely sliding the shield 62 with respect to the platform 50, the neck 76 of each rivet engages the throat 84 of each cooperating slot 80 to fasten the platform and shield. The oblong configuration of the centrally located hole 70 in the shield permits this limited relative sliding to occur with the spindle projecting through the shield.

Separation is prevented by the machine screw 64 which is inserted through a small hole 86 in the shield and engaged in a threaded hole 88 in the platform 62.

To secure an appliance to the support stand, the support platform is first secured to the appliance. Referring to FIG. 6, the support platform 50 is fastened to the underside of the television receiver 14 by conventional screws 90 through countersunk holes 92 in the platform. The support platform 50 is then coupled to the cover shield 62 as described above and secured by the locking machine screw 64.

Since the conventional fasteners attaching the support platform are concealed by the cover shield, and the locking machine screw 64 is concealed in the channel of the mounting unit when the platform assembly is placed and locked on the mounting unit, the only manner of removing an appliance fixed to the support stand without extraordinary means is by key.

Referring to FIGS. 8 and 9, an alternate embodiment of the support stand is shown which allows the appliance to be pivotally seated on a desk, counter or other like surface without unnecessary elevation. Essentially, the base and mounting unit of the preferred embodiment are combined into a single assembly dispensing with the columnar post. With reference to FIGS. 8 and 9, a molded circular base 94 is securable to a table 96 by four conventional fasteners 98 spaced in countersunk holes 100 in the base 94 as shown in phantom in FIG. 9. Integrally formed in the base 94 is a beveled socket 102, and locking mechanism 104 with a key operated bolt 106. The remainder of the alternate embodiment is identical to that previously described. The spindle 48 and connected platform assembly removably attach to the modified base 94 in the same manner as they removably attach to the mounting unit of the previously described embodiment.

In both embodiments none of the fasteners that either secure the stand to the floor, table or other supporting surface, or that secure the stand to an appliance are exposed and subject to tampering. In this manner, the vulnerability of the appliance to theft is greatly reduced or eliminated.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. An appliance support stand comprising: a base having means for fixedly securing said base to a pre-existing support surface; a mounting unit connected to said base, said mounting unit including a socket for receiving a spindle, and, a locking mechanism having a key operated displaceable bolt extendible into said socket; and, a support platform having a projecting spindle insertable and rotatable in said socket, said spindle having a longitudinal axis substantially perpendicular to said support platform, means for fastening said support platform to an appliance, a cover shield arranged between said support platform and said mounting unit concealing said fastening means, said cover shield having first coupling means on said cover shield and said support platform having second coupling means on said support platform, said first coupling means being slidably cooperative with said second coupling means for engaging said cover shield to said support platform, and at least one machine screw which fastens said cover shield to said support stand, said machine screw being positioned such that it is concealed between said mounting unit and said cover shield; wherein said spindle includes a peripheral channel formed to receive said displaceable bolt in all angular orientations about said longitudinal axis of said spindle when said spindle is inserted in said socket, said spindle being rotatable in said socket and inhibited from withdrawal from said socket by said bolt.

2. The support stand of claim 1 wherein said first coupling means and second coupling means are spatialy arranged substantially at the periphery of said cover shield and support platform.

3. The support stand of claim 1 wherein said first coupling means comprises projecting rivets having an elevated rivet head on said cover shield and said second coupling means comprises keyhole slots in said support platform.

4. The support stand of claim 1 wherein said means for fixedly securing said base to a pre-existing support surface comprises an expansion bolt.

5. The support stand of claim 1 wherein said socket and said spindle have cooperatively beveled surfaces.

6. The support stand of claim 1 wherein said mounting unit includes a circular slot and said machine screw has a projecting head received in said slot in all angular orientations of said support platform about said longitudinal axis of said spindle.

7. The support stand of claim 1 wherein said locking mechanism includes a key and a tumbler mechanism for selective operation of said key operated bolt.

8. The support stand of claim 1 further comprising a columnal post fixed between said mounting unit and said base and elevating said mounting unit from said base.

9. The support stand of claim 8 wherein said means for fixedly securing said base to a pre-existing support surface is concealed within said base and said columnar post.

10. The support stand of claim 1 wherein said mounting unit and said base comprise a unitary structure.

11. The support stand of claim 10 wherein said means for fixedly securing said base to a pre-existing support surface is concealed by said support platform and cover shield.

* * * * *